(12) United States Patent
Lee et al.

(10) Patent No.: US 6,775,765 B1
(45) Date of Patent: Aug. 10, 2004

(54) DATA PROCESSING SYSTEM HAVING INSTRUCTION FOLDING AND METHOD THEREOF

(75) Inventors: Lea Hwang Lee, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/498,814

(22) Filed: Feb. 7, 2000

(51) Int. Cl.[7] .............................................. G06F 9/38
(52) U.S. Cl. ...................................................... 712/241
(58) Field of Search ............................ 712/1, 218, 216, 712/233, 241, 205, 207; 717/156, 160, 161

(56) References Cited

U.S. PATENT DOCUMENTS

| | | | |
|---|---|---|---|
| 4,566,063 A | | 1/1986 | Zolnowsky et al. ......... 364/200 |
| 5,274,812 A | * | 12/1993 | Inoue ......................... 717/141 |
| 5,357,618 A | * | 10/1994 | Mirza et al. ..................... 711/3 |
| 5,764,951 A | * | 6/1998 | Ly et al. ......................... 716/1 |
| 5,953,512 A | * | 9/1999 | Cai et al. ..................... 712/205 |
| 5,958,045 A | * | 9/1999 | Pickett ........................ 712/229 |
| 5,958,048 A | * | 9/1999 | Babaian et al. .............. 712/241 |
| 5,974,538 A | * | 10/1999 | Wilmot, II ................... 712/218 |
| 6,148,439 A | * | 11/2000 | Nishiyama ................... 717/160 |
| 6,192,515 B1 | * | 2/2001 | Doshi et al. ................. 717/161 |
| 6,247,173 B1 | * | 6/2001 | Subrahmanyam ........... 717/160 |
| 6,260,116 B1 | * | 7/2001 | Davis et al. ................. 711/137 |

* cited by examiner

*Primary Examiner*—Eric Coleman
(74) *Attorney, Agent, or Firm*—Joanna G. Chiu

(57) ABSTRACT

Embodiments of the present invention relate generally to data processing systems having instruction folding and methods for controlling execution of a program loop. One embodiment includes detecting execution of a program loop and prefetching data in response to detecting execution of the program loop. Another embodiment includes detecting execution of a program loop and scanning the program loop for remote independent instructions or data dependencies during at least one iteration. Another embodiment includes detecting execution of a program loop and storing intra-loop data dependency information in a dependency bit vector, and using the dependency bit vector to select at least one local independent instruction available for folding. One embodiment includes an instruction folding unit comprising a first controller, a second controller, and a storage unit coupled to the second controller. Another embodiment includes a data processing system comprising a validation counter and a storage unit coupled to the validation counter where the storage unit includes a dependency bit vector corresponding to instructions of a program loop.

57 Claims, 7 Drawing Sheets

| | | | INSTRUCTION INDEX | STRIDE |
|---|---|---|---|---|
| L1: | ADDI | R2, 2 | −7 | N/A |
| | LD.H | R7, (R2) | −6 | 2 |
| | ADDI | R3, 1 | −5 | N/A |
| | LD.B | R6, (R3) | −4 | 1 |
| | MUL | R7, R6 | −3 | N/A |
| | ST.H | R7, (R2) | −2 | 2 |
| | DEC.NE | R1 | −1 | N/A |
| | BT | L1 | 0 | N/A |

| LOAD INSTRUCTIONS ||||  |
|---|---|---|---|---|
| INSTRUCTION INDEX | SOURCE REGISTER | STRIDE | PREFETCHED ADDRESS | PREFETCHED DATA |
| −6 | 2 | 2 | XXXXX | XXXXX |
| −4 | 3 | 1 | XXXXX | XXXXX |

*FIG. 7A*

| LOAD INSTRUCTIONS ||||
|---|---|---|---|
| VALID BIT | INSTRUCTION INDEX | SOURCE REGISTER | PREFETCHED DATA |
| 1 | 6 | 2 | XXXXX |
| 1 | 4 | 3 | XXXXX |

*FIG. 7B*

| STORE INSTRUCTIONS |||||||
|---|---|---|---|---|---|---|
| INSTRUCTION INDEX | SOURCE REGISTER 1 | SOURCE INSTRUCTION INDEX 1 | SOURCE REGISTER 2 | SOURCE INSTRUCTION INDEX 2 | STORE ADDRESS | STORE DATA |
| −2 | 2 | −7 | 7 | −3 | XXXXX | XXXXX |

*FIG. 8*

| ALU INSTRUCTIONS ||||
|---|---|---|---|
| INSTRUCTION INDEX | SOURCE REGISTER | INSTRUCTION INDEX OF THE INSTRUCTION MODIFYING THE SOURCE REGISTER | PRECOMPUTED DATA |
| −1 | 1 | XXX | XXXXX |

*FIG. 9*

|     |        |         | PREDICTABILITY | PREDICTABLE INSTRUCTION CLASS |
|-----|--------|---------|----------------|-------------------------------|
| L1: | ADDI   | R2, 2   | YES            | 2                             |
|     | LD.H   | R7, (R2)| YES            | 1                             |
|     | ADDI   | R3, 1   | YES            | 2                             |
|     | LD.B   | R6, (R3)| YES            | 1                             |
|     | MUL    | R7, R6  | NO             | N/A                           |
|     | ST.H   | R7, (R2)| YES            | 1                             |
|     | DEC.NE | R1      | YES            | 2                             |
|     | BT     | L1      | YES            | 3                             |

|  | | | X | Y |
|---|---|---|---|---|
| L1: | ADDI | R2, 2 | 0 | 0 |
|  | LD.H | R7, (R2) | 1 | 0 |
|  | ADDI | R3, 1 | 0 | 0 |
|  | LD.B | R6, (R3) | 1 | 0 |
|  | MUL | R7, R6 | 0 | 1 |
|  | ST.H | R7, (R2) | 0 | 1 |
|  | DEC.NE | R1 | 0 | 0 |
|  | BT | L1 | — | — |

BIT VECTOR

DATA PROCESSING SYSTEM HAVING INSTRUCTION FOLDING AND METHOD THEREOF

RELATED APPLICATION

This is related to U.S. patent application Ser. No. 09/100,669 filed Jun. 19, 1998, now U.S. Pat. No. 6,401,196, and entitled "Data Processor System Having Branch Control and Method Thereof" and is incorporated herein by reference and assigned to the current assignee hereof.

FIELD OF THE INVENTION

The invention relates generally to data processing, and more particularly, to a data processing system incorporating instruction folding.

RELATED ART

Lower power design techniques have been gaining importance in microprocessor and microcontroller design due to the widespread use of portable and hand held applications. Such applications require long battery life and low system cost. Furthermore, many of the applications embedded within these microprocessors and microcontrollers are characterized by spending a large fraction of execution time in program loops. These applications include paging, automobile control, signal processing, imaging and fax applications.

Therefore, a need exists for a low power, low cost system capable of improving the execution of these program loops to reduce an application's execution time.

BRIEF DESCRIPTION OF THE DRAWINGS

The present invention is illustrated by way of example and not limitation in the accompanying figures, in which like references indicate similar elements.

FIG. 7A includes an illustration of information captured by the data processing system of FIG. 1 for folding load instructions according to one embodiment of the present invention.

FIG. 7B includes an illustration of information captured by the data processing system of FIG. 1 for folding load instructions according to another embodiment of the present invention.

FIG. 8 includes an illustration of information captured by the data processing system of FIG. 1 for folding store instructions.

FIG. 9 includes an illustration of information captured by the data processing system of FIG. 1 for folding an Arithmetic Logic Unit (ALU) instruction.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

Figure 1:
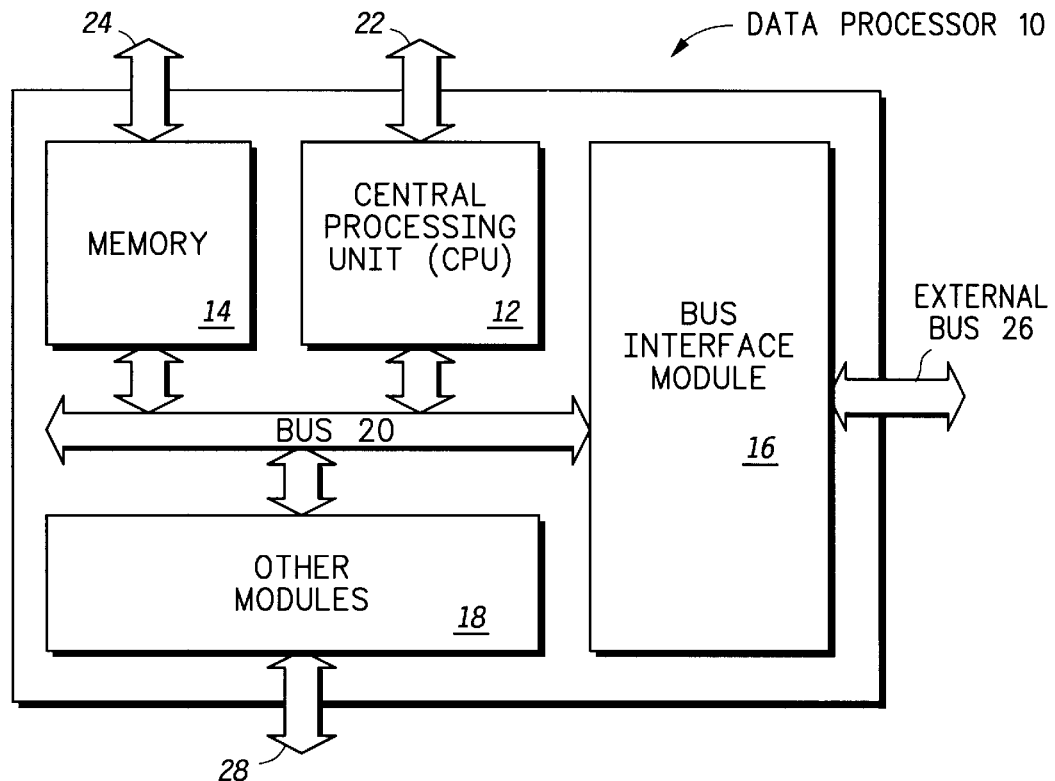
FIG. 1 includes an illustration, in block diagram form, of a data processing system in accordance with one embodiment of the present invention.

FIG. 1 illustrates, in block diagram form, a data processor 10 in accordance with one embodiment of the present invention. In one embodiment, data processor 10 includes a central processing unit (CPU) 12, memory 14, bus interface module 16, and other modules 18, which are all bidirectionally coupled to each other by way of bus 20. Bus interface module 16 may be coupled external to data processor 10 by way of external bus 26. Other modules 18 are optionally coupled external to data processor 10 by way of one or more integrated circuit terminals 28. Memory 14 is optionally coupled externally to data processor 10 by way of one or more integrated circuit terminals 24. Central processing unit 12 is optionally coupled external to data processor 10 by way of one or more integrated circuit terminals 22.

Still referring to FIG. 1, alternate embodiments may use any type of structure for data processor 10. In addition, data processor 10 may perform a wide variety of functions. For example, data processor 10 may use a RISC (Reduced Instruction Set Computer) architecture, may use a Harvard architecture, may be a vector processor, may be a SIMD (Single Instruction Multiple Data) processor, may perform floating point arithmetic, may perform digital signal processing computations, etc.

Figure 2:
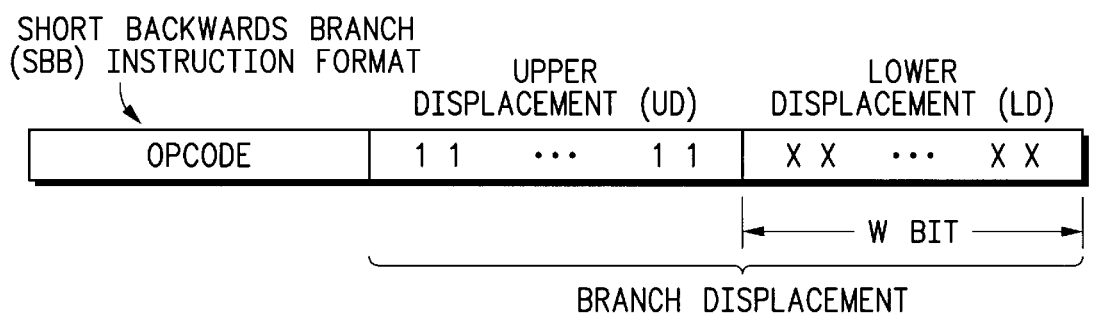
FIG. 2 includes an illustration of an instruction format for a short backwards branch (SBB) instruction.

FIG. 2 illustrates the instruction format for Short Backwards Branch instructions, denoted as an SBB instruction. An SBB is a conditional or unconditional program counter-relative (PC-relative) branch instruction. That is, different branch instructions (with different opcodes) can collectively be defined as SBBs.

These SBBs can be divided into two fields: (i) opcode, which specifies the type of branch; and (ii) branch displacement—the displacement to be added to the program counter (PC) to form the PC-relative branch target address. For SBBs, the branch displacement has leading ones, indicating that it has a negative branch displacement, and when added to the PC, produces a backward branch target.

The branch displacement field can be further divided into two fields: (i) an upper displacement field, denoted as UD and (ii) a lower displacement field, denoted as LD. The upper displacement field is all ones for an SBB, indicating a negative branch displacement due to the use of the 2's complement format for storing negative numbers. The lower displacement (LD) is w bits wide. An SBB would thus have a maximum backward branch distance of $2^w$ instructions.

In one embodiment of the present invention, when referring to "small" program loops defined by SBBs, w is defined to be 6, which corresponds to a loop containing a maximum of 64 instructions ($2^6$ instructions). However, larger or smaller loops may be examined for instruction folding by simply redefining w. Thus, branches defining loops with a maximum of greater than (or less than) 64 instructions may also constitute an SBB. Various embodiments may therefore define SBBs differently by defining a different w.

Figures 3, 4:
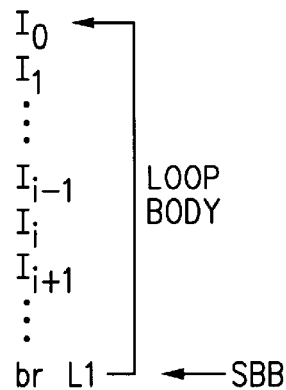
FIG. 3 includes an illustration of a program loop containing an SBB at the end of the loop.
FIG. 4 includes an illustration of a program loop with corresponding instruction indexes and strides.

FIG. 3 illustrates a generic program loop containing an SBB at the end of the loop. Thus, when the loop is executed and "br L1" is reached and taken, flow returns to instruction $I_O$ (the beginning of the loop, indicated by the label "L1:"). When the branch (br) is not taken, flow will fall through (or continue) with the next instruction after the branch. When an SBB is detected in an instruction stream and found to be taken (thus completing a first iteration through the loop), that SBB that triggered the transition is called the triggering SBB. As will be explained in more detail below, when an SBB is detected and taken, the controller assumes that a second iteration of the loop is being executed and the hardware begins collecting necessary information to perform instruction folding.

Instruction folding is generally a technique where the execution time is reduced or eliminated for a folded instruction. For example, if instruction $I_i$ of the loop of FIG. 3 were folded during the execution of the loop, the resulting instruction stream would require less execution time, and in some embodiments, zero execution time. It can be seen how this instruction folding saves a considerable amount of execution time because for each loop iteration, the execution time is reduced in proportion to the number of clock cycles saved by folding instruction $I_i$.

After certain initial "warm up" iterations, the instruction $I_i$ no longer requires its full execution time. However, in order to retain the correctness of the program execution, certain functionalities and information relating to $I_i$ have to be captured by the hardware for use during the loop's execution. Therefore, additional hardware is required to accomplish instruction folding, yet the benefits of instruction folding in applications with numerous small loops, especially with loops that are highly iterative, outweigh the additional hardware costs. The number of instructions within the loops that can be folded thus depends on the amount of hardware available to store the necessary information relating to the folded instructions. Furthermore, while any instruction in the loop is a candidate for folding, those instructions that are totally predictable or highly predictable work best, as will be discussed below.

The instruction folding technique discussed herein is especially useful in exploiting non-spatial Instruction Level Parallelism (ILP). If two independent instructions are close enough together in the instruction stream, they can be detected by the hardware without enlarging the instruction window. The instruction window size determines how many instructions can be examined by the hardware at a given time, such as by an instruction issue unit found in multi-issued superscalar machines. That is, the instruction window refers to the instructions that can be considered for issue to execution units during each cycle.

If the ILPs are non-spatial, meaning they are farther apart from each other, they can only be detected and exploited by the hardware by enlarging the instruction window and simultaneously examining all the instructions in the enlarged window for independent instructions. However, enlarging the instruction window is expensive in terms of hardware costs since more hardware is required to examine more instructions at a given time. In the context of program loop executions, in order to extract all possible ILPs, the instruction window would have to be as large as the program loop so that multiple instructions from different loop iterations can be examined simultaneously for dependencies. This is not always possible or available, since the hardware becomes increasingly expensive as the number of instructions to be examined increases. Therefore, embodiments of the present invention allow for the improved detection and exploitation of these non-spatial ILPs while maintaining a reasonable hardware cost.

Embodiments of the present invention allow the hardware to look across iteration boundaries of a loop for independent instructions and attempt to execute these "far ahead" independent instructions ahead of time. The execution of these instructions occur concurrently with the executions of the instructions that are currently in the instruction window. Therefore, by the time the instruction window moves forward and catches up with these "far ahead" instructions, they have already been completed and are ready to write-back or feed-forward their results. In effect, the hardware has expanded the effective dynamic instruction window to span across different loop iterations without enlarging the actual instruction window. These independent instructions that are far ahead of the current instruction window are referred to as the remote independent instructions (RIIs). On the other hand, those independent instructions that are currently inside the instruction window are referred to as local independent instructions (LIIs).

RII and LII are not static concepts but are relative concepts with respect to a given instruction stream. As an instruction window grows larger, some RIIs will become LIIs. Conversely, as the instruction window grows smaller, some LIIs will become RIIs. Therefore, the labeling of RII and LII is relative to the instruction stream and current instruction window.

Since the results of RIIs are precomputed, when the instruction window catches up with these RIIS, the resulting effective execution time is zero for these instructions. Folding RIIs refers to the retirement of the precomputed results at the proper time, and to the concurrent writing back of multiple results to the register files. Therefore, the number of results that can be written back in a single cycle will be limited by the number of write-back ports in the register files, as will be seen in reference to FIG. 13. Folding of an RII can also refer to reducing the long execution time of the RII, so that by the time the RII is ready to retire, it takes little or no time to compute and/or write back the result.

FIG. 4 illustrates a program loop ending with an SBB (the "bt" instruction) to be analyzed in accordance with an embodiment of the present invention. Notice that "bt" is a PC-relative branch that will return flow to label L1 (at the "addi" instruction) if the C bit of the control code register is set. That is, the loop will continue to execute so long as register 1 (r1) is not equal to 0. Using this program segment, it will be understood which instructions can be folded and how this folding is accomplished.

When executing a program loop, each instruction in the loop can be uniquely identified by an instruction index, as shown in FIG. 4. The instruction index of FIG. 4 increases from −7 for the first instruction (addi) to 0 for the last instruction (bt). These instruction indexes will be used as run time tags associated with these instructions to specify whether there is any data dependency between any two instructions. These indexes are also used to manage and control the feed-forwarding logic and instruction retirement activities, as will be described below. Although these indexes have been illustrated as increasing from a negative number to 0, any appropriate method of tagging each instruction is possible. Also shown in FIG. 4 is the stride for each instruction, if applicable. These strides will be discussed in more detail with reference to FIGS. 8 and 9.

Figure 5:
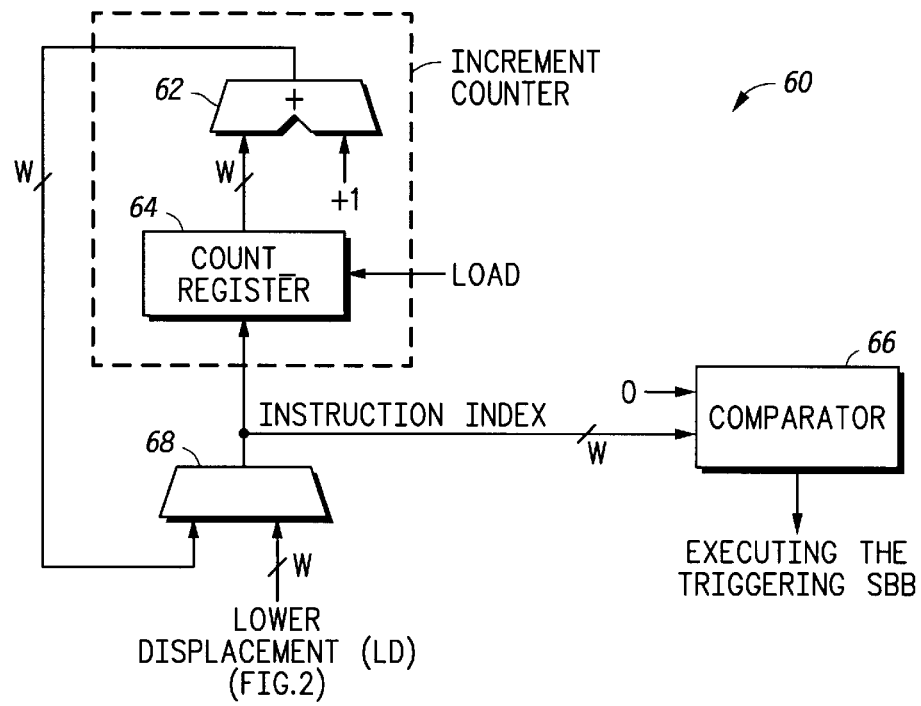
FIG. 5 includes an illustration, in block diagram form, of a controller to monitor SBB executions.

FIG. 5 illustrates, in block diagram form, a portion of a counter-based controller 60 to monitor SBB execution. Counter-based controller 60 includes adder 62, Count_Register 64, comparator 66, and multiplexer (MUX) 68. Count_Register 64 receives a load signal to enable it to load the output of MUX 68. The output of Count_Register 64 is w-bits wide and is one of the inputs to adder 62. Adder 62 also receives a value of one as its second input, and adds them to produce a w-bit output which is fed back to MUX 68 as one of its inputs. Therefore, adder 62 is used to increment Count_Register 64. The second input to MUX 68 constitutes the w-bit LD (see FIG. 2). MUX 68 either loads LD into Count_Register 64 (i.e. resets Count_Register 64 to its appropriate starting value, LD), or increments the value already present within Count_Register 64 (i.e. increments the counter). The w-bit output of MUX 68 is also one of the inputs to comparator 66. Comparator 66 compares this input with its second input, a value of 0, and produces an output that is used to determine if the triggering SBB is being executed. Comparator 60, in effect, monitors the output of MUX 68 (which corresponds to the current instruction index value) to determine the end of the count.

In operation, counter-based controller 60 monitors SBB executions. When an SBB is encountered and taken, its lower displacement field, LD (see FIG. 2), is loaded into w-bit Count_Register 64. The hardware of controller 60 then infers the size of the program loop from this branch displacement field. If LD is −7, then the program loop size is 8 instructions long (see FIG. 4, as the instruction index goes from −7 to 0). By incrementing the negative displacement in Count_Register 64 by one each time an instruction within the loop is executed sequentially, controller 60 monitors the loop execution and is able to determine which instruction is being executed. When the counter becomes 0 (determined by comparator 66), an SBB is being executed, because a 0 instruction index refers to the last instruction in the loop, i.e. the branch, as can be seen in FIG. 4. If the triggering SBB is taken again, Count_Register 64 is re-initialized with the LD field from the SBB, and the process described above repeats itself.

Using this process, controller 60 is able to determine whether a change of flow in the program's execution was caused by the triggering SBB or not. For example, if an instruction somewhere within the loop causes the flow to exit early and not complete the rest of the loop, the counter implemented by controller 60 will not reach zero, meaning the triggering SBB was never reached. Thus, the change of flow was not due to the SBB but by some other branch, jump, etc. However, if the instruction index value does in fact reach 0, comparator 66 detects that an SBB is being executed.

While a counter-based scheme was described in reference to FIG. 5, any method of monitoring a loop's execution to determine the execution of an SBB can be used. A different counter-based scheme may be used, or a different method all together, depending on how each instruction is identified. For example, the counter need not count up from a negative value to zero, but any counting scheme may be appropriate. Alternatively, another system of tagging other than the instruction index may be used for identifying instructions in the loop. This may require a different monitoring scheme, not based upon a counter system at all. Furthermore, it is possible that not every instruction in the loop requires a tag or unique identification. Therefore, counter-based controller 60 is merely an example hardware setup to accomplish the monitoring of SBB executions.

As described above, the counter value (found at the output of MUX 68) gives the instruction index corresponding to the instruction in the loop currently being executed. This instruction index is also used to determine when the pre-computed result associated with a folded instruction needs to be given to the register file. Therefore, when an RII is chosen to be folded, its instruction index is also recorded, as will be described below. By comparing the current instruction index with the instruction index corresponding to the folded RII, the precomputed result is retired or written back to the register file at the appropriate time within the execution of the instruction stream because the instruction index alerts the system that the folded instruction's result is needed.

Figure 6:
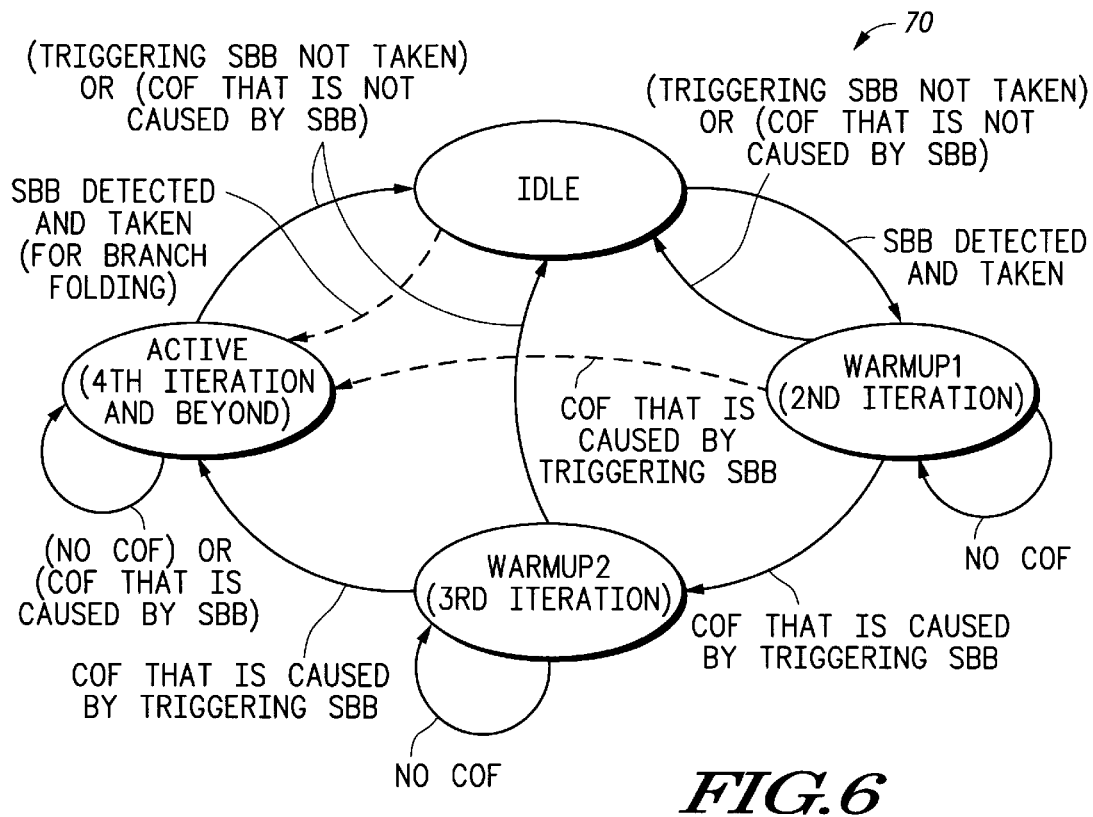
FIG. 6 includes an illustration, in state machine form, of a controller for managing the execution of program loops.

FIG. 6 illustrates, in state machine form, an example of a controller for managing the execution of these RIIS. State machine 70 includes various states that are indicated by a circle: IDLE, WARMUP1, WARMUP2, and ACTIVE. The paths taken from state to state are indicated by arrows, and the direction of these arrows must be followed. For example, the only state (other than IDLE) that may follow the IDLE state is WARMUP1 because the only out-going arrow from IDLE leads to WARMUP1. Furthermore, each of these arrows is labeled with a corresponding condition required for a state transition. Therefore, for state machine 70 to transition from IDLE to WARMUP1, a "detected and taken SBB" is required (which is indicated by the label found on the arrow which points from IDLE to WARMUP1); otherwise, state machine 70 will simply remain in the IDLE state. Each arrow is labeled with a corresponding condition, and these conditions are required for the corresponding transitions to occur. If a condition causing a transition from the current state to another does not occur, state machine 70 will remain in the current state.

State machine 70 begins with an IDLE state. If an SBB is not detected and taken, state machine 70 will remain in the IDLE state. When an SBB is decoded (and thus detected), its LD field is loaded into Count_Register 64 as was described with reference to FIG. 5. If this SBB is taken, state machine 70 then enters a first "warm up" state, WARMUP1. State machine 70 enters WARMUP1 at this point because while in the IDLE state, an "SBB was detected and taken" thus causing state machine 70 to follow the arrow from IDLE to WARMUP1. The SBB is now referred to as the triggering SBB since this SBB triggered state machine 70 to transition from IDLE to WARMUP1.

Depending on the types of RII, which will be discussed in more detail with reference to FIGS. 7A–10, there could be more than one "warm up" states. Each of these warm up states corresponds to a single loop iteration, and during these warm up states, the information required for instruction folding is determined before the full advantages of instruction folding can be achieved. FIG. 6 shows a state machine with two warm up states, namely, WARMUP1 (which, as mentioned above, corresponds to a loop's second iteration) and WARMUP2 (which corresponds to a loop's third iteration). Therefore, depending on the types of instructions to be folded and the methods used to accomplish the folding, more or less warm up states may be required to achieve the desired results.

When an SBB is detected and taken, state machine 70 first enters the WARMUP1 state. As the negative value in Count_Register 64 increases and becomes zero, state machine 70 knows that an SBB is currently being executed. If the triggering SBB is not taken, state machine 70 returns to the IDLE state as indicated by the return branch from WARMUP1 to IDLE. The other condition that could have caused the return from WARMUP1 to IDLE is a change of flow (cof) that was not caused by the SBB. Otherwise, state machine 70 enters WARMUP2 when the triggering SBB is taken, where WARMUP2 corresponds to the third iteration of the loop (since this is the second time the SBB is taken). Note that so long as no change of flow is detected during the second iteration, state machine 70 remains in WARMUP1, as indicated by the arrow pointing from WARMUP1 back to itself.

Likewise, in WARMUP2, more information required for instruction folding is determined before entering the ACTIVE state. The loop executes its third iteration while in the WARMUP2 state, and if the triggering SBB is not taken or if a change of flow (cof) occurs that is not caused by the SBB, state machine 70 returns to the IDLE state. This is indicated by the arrow from WARMUP2 to IDLE. Note that so long as no change of flow is detected during this third iteration, control remains in WARMUP2, as indicated by the arrow pointing from WARMUP2 back to itself. Otherwise, if a change of flow is in fact caused by the triggering SBB, then state machine 70 enters the ACTIVE state, indicated by the arrow from WARMUP2 to ACTIVE.

When in the ACTIVE state, state machine 70 initiates all necessary control actions to execute the RII. At this point, the folded instructions take zero execution time during each subsequent iteration. While in the ACTIVE state, state machine 70 will return to the IDLE state if one of the following two events occurs: (i) the triggering SBB is not taken (the loop sequentially exits through the SBB), or (ii) there is a change of flow that is not caused by the triggering SBB.

For load and store types of RII, both the WARMUP1 and WARMUP2 states may be needed to gather all the necessary information for folding these load and store instructions. However, for branch instructions, no warmup states are necessary. Folding of branches can occur starting from the second iteration of the loop. This is indicated by the dotted arrow from IDLE to ACTIVE in FIG. 6. In this case, state machine 70 would require only two states (IDLE and ACTIVE) and the arrows between them. For other ALU types of RII to be folded, only the WARMUP1 state is needed, but not the WARMUP2 state. This is indicated by the dotted arrow that points from WARMUP1 directly to ACTIVE. In this case, the state, WARMUP2, is unnecessary and state machine 70 would not require WARMUP2 or the arrows pointing to and from WARMUP2. Instead, all this would be replaced by the dotted arrow.

If both load and store types as well as branch and other ALU types are to be folded, then having multiple state machines, one for each of these instruction types to be folded, might be appropriate. Alternatively, it can also be implemented as a single state machine with more machine states that those illustrated in FIG. 6. However, many different and unique state machines can be designed and developed having additional or fewer states, as required by a particular data processing system. For example, the concept of instruction folding may be combined with other designs and thus increase the size of the state machine required to accomplish similar goals.

Referring to the instructions shown in the program loop illustrated in FIG. 4, every instruction in this loop is a candidate for folding. In general, the instructions will be divided into four classes for folding: (i) load folding, (ii) store folding, (iii) general ALU instruction folding, and (iv) branch folding. More classes can be defined if other types of instructions are to be folded, or some of these classes may be combined into a single class, depending on the needs of the data processing system.

The first class to be discussed will be load folding, which amounts to the use of hardware based data prefetching when executing program loops. There are various ways in which this data prefetching can be done. FIG. 7 illustrates an example of registers contained in a prefetch unit that store the required information for load folding. The information stored in these registers of FIG. 7 correspond to constant stride data prefetching. In this approach, the load addresses are speculatively generated assuming that these load addresses exhibit constant stride behaviors. A data prefetch unit performs a constant stride data prefetch from memory and loads this data into a prefetch buffer.

The stride value of a load instruction is given by the difference between two consecutive load addresses produced by the corresponding load instruction. For example, in the case of the load instruction "ld.h r7,(r2)", shown in FIG. 4 at instruction index −6, the contents of register 2 (the source register) are used as a load address to fetch data from the memory and load it into register 7. During the next loop iteration, before this load instruction is executed again, the value of register 2 is incremented by 2. This is accomplished by the instruction "addi r2,2", located at instruction index −7. Therefore, when the load instruction is executed during the second loop iteration, register 7 is loaded with the memory contents located at an address 2 units away from the address stored in register 2 in the previous loop iteration. That is, during each iteration, the contents of register 2 is incremented by 2 and this becomes the new value of the source register for the load instruction. For example, if 3 were being subtracted each time (with the "subi" instruction), then the stride for this load instruction would be −3.

One embodiment stores this information in the format illustrated in FIG. 7A which contains a field for the prefetched address and the prefetched data, thus effectively being a prefetch buffer. These registers will in effect contain all the information required to precompute the result of the corresponding folded load RII and provide the result to the register file at the correct time for proper instruction stream execution. If more than one load instruction in the loop is to be folded, then the prefetch unit will have multiple prefetch buffers, one for each load instruction to be folded. In this case, the prefetch unit will contain an instruction index, source register identification, unique stride, prefetch address, and prefetched data for each load instruction.

In FIG. 4, there are two load instructions to be folded, located at instruction indexes −6 and −4. They each have unique stride values of 2 and 1, respectively, also shown in FIG. 4. As shown in FIG. 7A, the hardware maintains the required information for each load instruction to be folded. Any format may be used to store the required information. For example, FIG. 7A can represent a bank of registers containing a register for each folded instruction. The number of load instructions that may be folded is therefore limited by the amount of hardware available to store the information. The information can be stored in a prefetch unit contained in CPU 12, as will be discussed further in reference to FIG. 13.

During the WARMUP1 state of state machine 70, the hardware collects information for the instruction index and the source register (the register from which the load address is generated). That is, during the second iteration of the loop, the hardware collects and stores these two pieces of information in a format like that shown in FIG. 7A. During the WARMUP2 state (the third iteration of the loop), the hardware collects and stores the stride value. Then from the fourth iteration and beyond (the ACTIVE state), the hardware can proceed with a constant stride prefetching and load instruction folding. That is, before even reaching the next iteration, the memory data for each load instruction can be prefetched and be ready when the time comes to execute each load. Therefore, when the instruction index reaches −6, the load instruction would be folded out and the prefetched data would simply be provided to the register file at the right time. The same would occur for the load at instruction index −4. Once in the ACTIVE state, the full benefit of the folded out load instructions is achieved because it is at that point that all the required information necessary to precompute the folded instruction (in this case, prefetch the data) is available.

Alternatively, a load instruction may be folded using a non-constant stride data prefetching method. There are various ways to accomplish this. One way is to store the source instruction index instead of the stride. For example, the first entry of FIG. 7A, instead of having a 2 stored in the stride's location, would have a −7 stored in this location (making it the source instruction index location). This −7 refers to the "addi" instruction that modifies the load instruction's source register, r2. Therefore, if r2 were not modified in a constant manner, with a constant value, the load address during each iteration could be determined by sourcing from the instruction that actually modifies the source register. Using this method, the load is not at all speculative because it is based on the correct load address since a data prefetch load is not initiated until the actual load address is available. Therefore, there is no guess work about the stride since it is calculated each time before the prefetch.

In this case, during the WARMUP1 state, i.e. the second iteration, the hardware collects information corresponding to the instruction index and source register, just as with the constant stride data prefetching described above. During the WARMUP2 state, the third iteration, the hardware collects information for the source instruction index using the information found during the second iteration. Once the source register is known during the second iteration, its source instruction index can be determined and stored during the third iteration. From the fourth iteration and beyond (the ACTIVE state), the hardware can proceed with data prefetching as soon as the load address is available (that is, as soon as the instruction at the source instruction index completes its execution). Thus, this also successfully folds out a load instruction.

Another alternative method for performing this non-constant stride data prefetching is to replace the source instruction index information stored in the previous method with a bit mask vector. The number of bits in this vector equals the number of registers in the Instruction Set Architecture (ISA). One 15 embodiment includes 16 such registers (r0–r15); however, depending on the data processor's architecture, a different number of registers may exist in the ISA.

The bit vector in this approach starts off with all of its bits cleared. Starting from the beginning of WARMUP (the second iteration), when a register is modified by an instruction in the loop, the corresponding bit in the bit vector is set. When a load instruction is encountered, its source register is noted. If the corresponding bit in the bit vector for this source register is not set (indicating that the source register is not being modified by any instruction prior to the load instruction within this loop), then this load instruction will be eligible for prefetching. Starting from the next iteration (third iteration) and beyond, a data prefetch can be initiated as soon as the SBB is taken, since no instruction modifies the source register for the load instruction prior to the load in the loop.

For this alternative approach, the compiler tries to schedule the instructions that modify the source registers for the load instructions at the end of the loop, preferably immediately after the load instructions. In this way, the prefetching for load instructions can be initiated as soon as the branch instruction is taken. Using this method, data prefetching can begin as soon as the third iteration, meaning that there is no WARMUP2 state. For example, a program loop similar to that of FIG. 4 can be rewritten as follows below. (Note that the following loop is a rewrite of the loop of FIG. 4 with the exception of the added instruction, "ld.w r5, (r3,4), " which is used to better illustrate this alternative method.)

| L1: | mul    | r7,r6     | //does not modify r2 or r3 |
|     | st.h   | r7,(r2)   | //does not modify r2 or r3 |
|     | dec.ne | r1        | //does not modify r2 or r3 |
|     | ld.h   | r7,(r2)   | //load instruction |
|     | addi   | r2,2      | //modifies r2 |
|     | ld.b   | r6,(r3)   | //load instruction |
|     | addi   | r3,1      | //modifies r3 |
|     | ld.w   | r5,(r3,4) | //load instruction |
|     | bt     | L1        | //SBB |

Figures 10, 11:
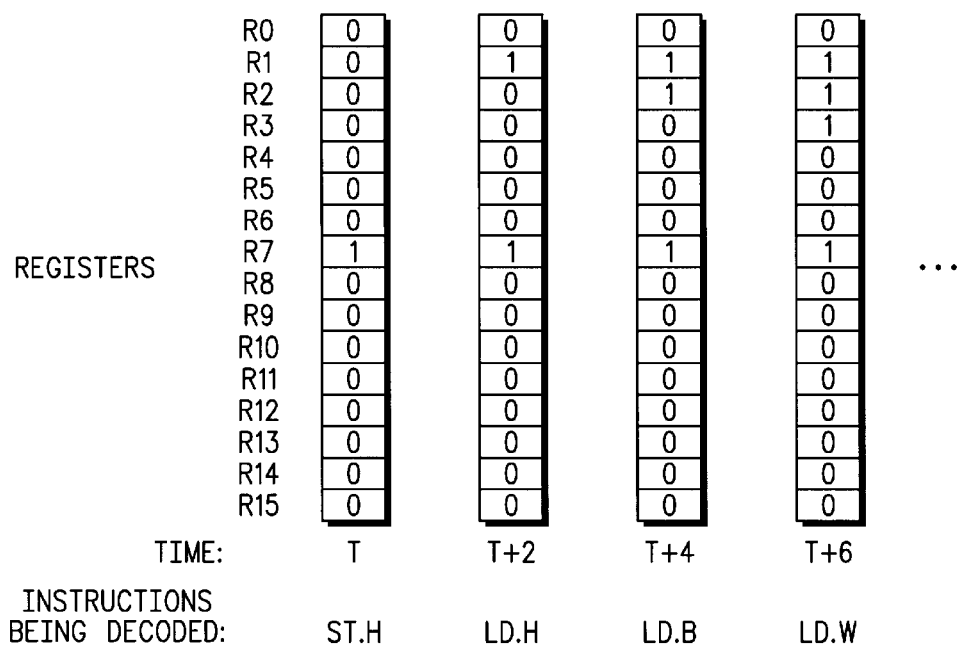
FIG. 10 includes an illustration of information captured by the data processing system of FIG. 1 for folding branch instructions.
FIG. 11 includes an illustration of a bit vector in accordance with one embodiment of the present invention.

This alternate approach, through the use of a bit vector, is further explained in reference to FIG. 11. FIG. 11 illustrates a bit vector used in this embodiment, where each bit in the bit vector corresponds to a register of the ISA. In this embodiment, there are 16 registers; therefore the bit vector is 16 bits long. The bit vector in FIG. 11 is shown at different instances in time as the loop runs its second iteration (during WARMUP1). For example, the first instantiation of the bit vector corresponds to time t which in turn corresponds to the decoding of the "st.h" instruction. The second instantiation of the bit vector corresponds to time t+2 which corresponds to the decoding of the "ld.h" instruction. Likewise, the third instantiation corresponds to time t+4 (the decoding of the "ld.b" instruction), and the fourth iteration corresponds to time t+6 (the decoding of the "ld.w" iteration).

Each time a register is modified by an instruction in the loop, the corresponding bit in the vector is set. For example, the "mul" instruction modifies register 7 (r7) by multiplying the contents of r7 by the contents of r6, and storing this result back in r7. Therefore, when r7 is modified, the bit corresponding to r7 is set, as shown in FIG. 11 with a "1" in the $8^{th}$ bit location of the bit vector. Likewise, the "dec.ne"

instruction modifies r1, and the bit corresponding to r1 is set. Therefore, at time t+2, during the decoding of the "ld.h" instruction, its source register (r2) is noted. Since at this time t+2, the bit corresponding to r2 (the $3^{rd}$ location in the bit vector) is not set, the source register has not been modified prior to this "ld.h" instruction, thus making this "ld.h" instruction eligible for data prefetching. Likewise, at time t+4, when the "ld.b" is encountered, the bit corresponding to r3 (the source register of this load instruction) is not set, and thus this load is also eligible for prefetching. However, when "ld.w" is encountered, and its source register (r3) noted, the corresponding bit in the bit vector is set, meaning that "ld.w" is not eligible for data prefetching under this method.

In the above example, prefetching for both "ld.h" and "ld.b" instructions can be initiated as soon as the branch instruction "bt" of the previous iteration is taken. In this case, the hardware, through the use of the bit mask vector, knows that r2 and r3 are not being modified until after these two load instructions are executed. Therefore, these two load instructions in this loop using this method can be folded out using only one warm-up state. However, "ld.w" cannot be folded out because r3 is being modified by the "addi r3,1" instruction before the "ld.w" instruction is executed. If its data is prefetched as soon as the branch instruction "bt" of the previous iteration is taken, the result would be incorrect.

Another alternate method for performing loop based data prefetching maintains in hardware the information illustrated in FIG. 7B. The table illustrated in FIG. 7B contains two entries where each entry includes four fields: (i) a valid bit (which is set to "1" if the corresponding entry is valid); (ii) the instruction index of the load instruction; (iii) the source register of the load instruction; and (iv) the prefetched data. In this embodiment, when a load instruction is encountered, an entry of the table is allocated for this instruction. Upon an allocation, field (i) is set to "1"; field (ii) is set to "0"; and field (iii) is set to the source register of the load instruction. When another load instruction is encountered, another entry is allocated. If the table is full, the oldest entry may be replaced to make room for the new load instruction. Therefore, a round-robin replacement scheme can be used where the oldest entry is always replaced by the newly encountered load instruction. For a table with n entries, up to n most recently encountered load instructions are captured in this table. Therefore, depending on the hardware constraints of the system, the table can have more than just the two entries illustrated in FIG. 7B.

In this embodiment, field (i) of all entries in the table are reset to "0" upon encountering a change of flow. That is, they are all invalidated. Otherwise, when a change of flow is not being currently encountered, for each instruction executed sequentially, field (ii) of all valid entries are each incremented by one. Thus, when an SBB is detected and taken, field (ii) of each entry indicates the instruction distance between the SBB and the corresponding load instruction. This field is then compared with the loop size information inferred from the SBB instruction using the LD field. If the instruction distance indicated in field (ii) is smaller than the loop size, the corresponding load instruction is located inside the loop body. In this case, a prefetch is initiated for this load instruction, using the address calculated from the source register read from the register file. If the instruction distance indicated in field (ii) is larger than the loop size, then the corresponding loop instruction is located outside the loop body. This entry is invalidated and no prefetch is initiated for that load instruction.

Thus, when an SBB is first detected and taken, multiple load instructions within the loop body could potentially trigger prefetch activities at the same time. However, only those load instructions that are within the loop body are eligible for prefetching. Among these eligible load instructions, an oldest-first scheme can be used to prioritize the prefetching activities. That is, among these instructions, the oldest instruction has the highest priority to initiate a prefetch. Therefore, when an SBB is detected and taken, those entries associated with the load instructions outside the loop body are invalidated. Those entries associated with the load instructions inside the loop body will have their field (ii) negated. Once this field is negated, this field will become a negative value and will correspond to the instruction index for the load instruction.

For example, referring to the program loop of FIG. 4, when an SBB is detected and taken at the end of the first iteration, the contents of the table is shown in FIG. 7B. Both entries in this table are valid. Once the hardware determines that these entries are for load instructions inside the loop body by comparing their (ii) fields (6 and 4, respectively) with the loop size (8), the hardware negates the (ii) fields. After this negation, the two entries for field (ii) become −6 and −4, respectively. These values correspond to the instruction indices for the two load instructions. Also, at the same time, a prefetch is initiated for the first entry, since this entry is the oldest eligible load instruction. Then another prefetch is initiated for the second entry. Using these scheme, no "warmup" iteration is required. Data prefetching can be initiated at the end of the first iteration. Furthermore, the prefetch activities initiated using this scheme do not contain data value speculation. However, they still contain control flow speculation.

Store RII instructions may also be folded. FIG. 8 illustrates a portion of the hardware (i.e. a data write buffer) used for each store instruction to be folded. The information maintained by the data write buffer includes: (i) the instruction index of the store instruction, (ii) for each of its source operands, its source register and the instruction index for the instruction that generates the source operand, (iii) the store address, and (iv) the store data. Unlike other types of write data buffering, the store folding described here is not speculative in nature. It behaves like a write buffer, but allows the store instruction to be folded out and thus not consume any execution cycles.

ALU instructions may also be folded, and the information maintained for each ALU instruction to be folded includes: (i) the instruction index of the instruction, (ii) the source register, (iii) the instruction index of the instruction modifying the source register or generating the source operand, and (iv) the result (i.e. the precomputed data). Alternatively, the hardware may simply contain (i) the instruction index of the instruction, (ii) the source register, and (iv) the result if the folded ALU instructions are restricted to those whose source register is not modified by any other instruction. The hardware related to an ALU instruction is illustrated in FIG. 9, with the entries corresponding to the "dec.ne r1" instruction, where r1 is only modified by the instruction itself. However, if r1 were modified by another instruction, the hardware would also store that instruction's index in field (iii).

Branch instructions may also be folded. For example, the SBB at the end of the program loop in FIG. 4 may be folded out; however, any branch, conditional or unconditional, is a candidate for folding. The source operand for the conditional branches is the condition code, and the write back register would be the program counter (PC) (in order for the program to jump to the proper address location). However, when a folded conditional branch is incorrectly predicted, recovery actions are taken to eliminate the side effects of incorrect branch prediction. These recovery actions include squashing the instructions that were not supposed to be executed, updating the PC to the correct value, and continuing the fetching and execution for the correct PC.

As mentioned above, folding of branch instructions does not only refer to folding out the SBB at the end of the loop. This method may be used to fold out any conditional or unconditional branches within the body of the loop. For example, FIG. 10 illustrates the information needed to fold out a PC-relative branch. This branch need not be an SBB. For conditional branches, the following fields are needed: (i) instruction index of the folded branch, (ii) the condition code value for the branch to be taken, (iii) the instruction index of the instruction that modifies the condition code, (iv) whether the branch should be taken or not taken, and (v) the branch target. Field (iv) is set to "taken" or "not taken" in each iteration of the loop, depending on the execution of the last instruction that modifies the condition code (the instruction index of this instruction is specified in (iii)). For unconditional branches, only (i) the instruction index, (iv) whether the branch should be taken or not taken, and (v) the branch target are needed. In this case, the "taken or not taken" field is set to "taken."

During the second iteration (WARMUP1), information corresponding to fields (i), (ii), and (v) are collected by the hardware. During the third iteration (WARMUP2), information corresponding to field (iii) is collected by the hardware. All the information for fields (i), (ii), (iii), and (v) only need to be updated once per loop invocation. After that, they will both be changed for the rest of the loop execution. For unconditional branches, information in field (iv) will be also be updated only once. However, for conditional branches, field (iv) will be updated in every iteration.

To fold out conditional branches, the last instruction that modifies the condition code should be scheduled and executed sufficiently far ahead in time relative to the conditional branch to be folded, in order for the hardware to have sufficient time to update or feed forward the information corresponding to field (iv). To fold out register-indirect jumps, an additional field to store the instruction index of the instruction that modifies the source register for the jump target is needed. This field will be updated as soon as the instruction that modifies the jump register completes its execution.

In general, hardware costs of implementing these instruction folding techniques can be reduced if the types of instructions to be folded are restricted to single source operand instructions. Therefore, the amount of hardware required to implement instruction folding will vary depending on the types of instruction chosen to be folded. While any instruction can be folded, those that are totally or highly predictable may be better adapted to folding.

When an instruction is allowed to be speculatively executed, then the result it generates may not be valid and need to be "discarded." For example, if a prefetch is performed for a load where a constant stride is assumed, and the stride is in fact non-constant, then the prefetched data is garbage and the information is invalid. Two types of speculation can be identified: (i) control flow speculation, where the execution of an instruction is conditioned by a conditional branch (or branches) and (ii) data value speculation, where the validity of the result produced by the instruction depends on the validity of its source operands. In general, branch prediction introduces control flow speculations. Speculative data prefetching, on the other hand, introduces data value speculation on instructions that consume the prefetched data. Thus, if we eliminate one form of speculation from the instruction executions, then the validity of the results will become more reliable and less likely to be discarded. This is also advantageous from a power consumption point of view because there are less wasted results and many times, extra recovery cycles are required to handle and repair discarded results.

In many embedded program loops, many of the operations specified in the loop are highly predictable, in the sense that the results of the computation are predetermined upon entering the program loop. Therefore, instruction folding of highly or totally predictable instructions offers the most benefit. While some instructions may be totally predictable in that they do not contain data value speculation, they may still contain control flow speculation. However, they are still less speculative since one form of speculation (data value speculation) is eliminated.

In general, load addresses generated by a constant-stride load instruction in a program loop are totally predictable if the following conditions are met:

the load instruction calculates its load address based on a register, and this base register is only modified by a single "addi" (add immediate) or a single "subi" (subtract immediate) instruction within the loop body; and no other instruction modifies that register.

An add immediate or a subtract immediate refers to adding or subtracting an immediate value to the source register. For example, values from other registers or address locations are not immediate, but real numbers whose value is to be added to or subtracted from the source register. By limiting the register modifying instructions to the addi and subi instructions, a constant stride load is guaranteed. Furthermore, the stride value of the load or store instruction can be obtained from the immediate value.

By restricting the foldable load RIIs to those that are totally predictable, folding of the instruction can begin at the fourth iteration. The first iteration corresponds to the SBB detection. During the second iteration, the location of the load instruction and the register in which the load address calculation is based on is identified. This register is also called the base register of the load instruction. During the third iteration, an "addi" or "subi" instruction, with the base register as its destination, is identified. Also during this iteration, the hardware examines each instruction in the loop to ensure that the "addi" or "subi" is the only instruction that writes to the base register. The stride value for the load instruction is also identified during the third iteration. Therefore, during the fourth and subsequent iterations, the load instruction is completely folded out of the instruction stream.

Likewise, the bit vector method for non-constant stride load prefetching discussed above in reference to FIG. 11 is also totally predictable. Furthermore, this method removes the need for a WARMUP2 state. Just as above, the first iteration corresponds to the SBB detection. However, during the second iteration, the bit vector is setup according to which registers in the ISA are modified. The results of this bit vector are used during the second iteration to determine which load instructions can be folded. Since only those load instructions whose source registers are not modified by previous instructions in the loop prior to their execution are folded, the prefetched data is always correct, thus making the folded load instruction totally predictable. Therefore, any load instruction folded in this manner is considered totally predictable.

An ALU instruction is said to be totally predictable if one of the following conditions is met:

no source operand of the instruction is modified within the loop; or if a source operand of the instruction is modified within the loop, then it is only modified by the instruction itself, and not by any other instruction.

In the loop of FIG. 5, the two "addi" instructions and the "dec.ne" instruction are to tally predictable ALU instructions.

Figures 12, 13:
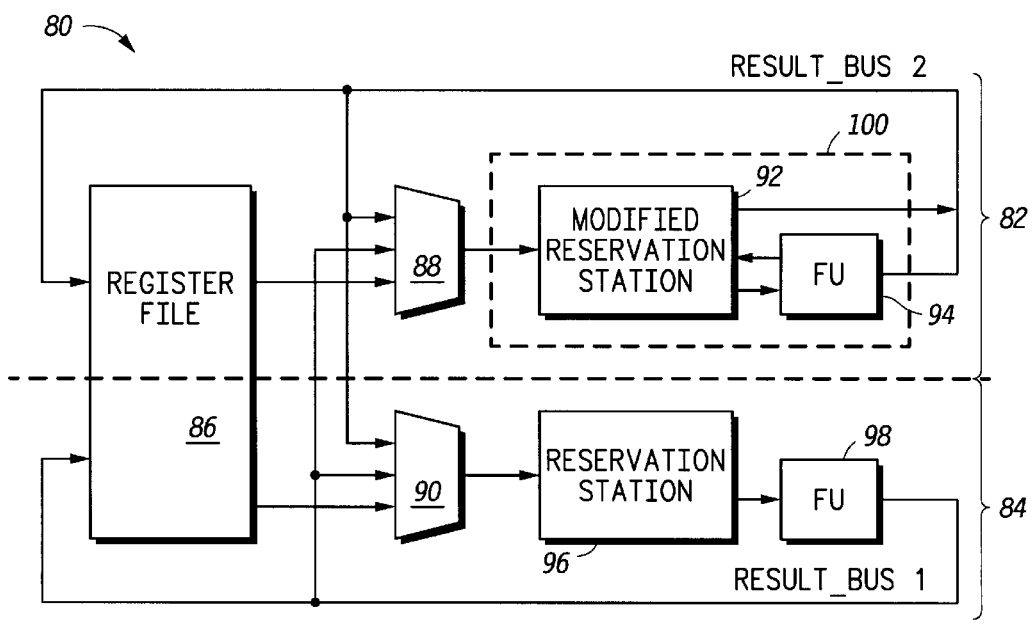
FIG. 12 includes an illustration of a program loop with corresponding predictability information.
FIG. 13 includes an illustration of a datapath for instructions, in accordance with one embodiment of the present invention.

According to the above conditions for determining totally predictable instructions, all of the instructions in the program loop of FIG. 4 are totally predictable, except the "mul" and "bt" instructions. FIG. 12 illustrates the same instructions as those in FIG. 4, with a corresponding column determining predictability and the class of the predictable instruction. Class 1 refers to a predictable load instruction, class 2 refers to a predictable ALU instruction, and class 3 refers to a predictable SBB instruction. Note that as discussed above, all but the "mul" and "bt" happen to be totally predictable instructions, but the "bt" is a highly predictable SBB. However, if a detected SBB is folded but mispredicted, a recovery operation must correct the misprediction. Since the SBB will not always be correctly predicted, it is not totally predictable, but highly predictable (mostly due to the fact these loops are generally highly iterative) and still a good candidate for folding.

Each instruction in FIG. 12, except for the "mul," can be folded assuming there is sufficient hardware to support storing the necessary precomputed results as was described above. For example, there would need to be sufficient hardware to fold two load instructions, one store instruction, three ALU instructions, and one branch instruction. This method has the potential of saving a large percentage of execution time by folding most of the instructions within the program loop. Instruction folding is most beneficial when the loops require more than 3 or 4 iterations, since instruction folding generally requires at least one warm-up iteration.

An advantage of folding predictable instructions is that the results being produced are mostly guaranteed to be correct. Data prefetching using the scheme of folding totally predictable load instructions is guaranteed correct since there are no wasteful data prefetches associated with incorrect load addresses. However, if a loop exits when a data prefetch is already initiated, then there will still be a wasteful prefetch associated with this control flow speculation.

FIG. 13 illustrates a portion of a datapath 80, located in CPU 12 of FIG. 1, for folding RIIs in accordance with one embodiment of the present invention. Datapath 80 is similar to a dual-issued superscalar machine, and includes instruction folding unit 100, reservation station 96, functional unit 98, MUX 88, MUX 90, and register file 86. Instruction folding unit 100 includes modified reservation station 92 and functional unit 94. Each functional unit 94 and 98 includes a load/store unit and an ALU unit (not illustrated) with a MUX to choose which of the two unit's output to provide to the result bus depending on the instruction type being executed. Datapath 80 may also more closely resemble a multi-issued superscalar machine, and include any number of reservation stations like reservation station 96 with a corresponding functional unit like functional unit 98, where the reservation stations and functional units would be coupled to datapath 80 in the same fashion as reservation station 96 and functional unit 98.

Register file 86 has two write back ports to receive two inputs: one from result_bus2, which is provided by instruction folding unit 100, and the other from result_bus1, which is provided by functional unit 98. Instruction folding unit 100 has two outputs coupled to result_bus2, one from modified reservation station 92, and the other from functional unit 94. Modified reservation station 92 is bidirectionally coupled to functional unit 94, and coupled to the output of MUX 88. Reservations station 96 is coupled to functional unit 98 and MUX 90. MUX 88 and MUX 90 are each coupled to result_bus1, result_bus2, and an output of register file 86. MUXes 88 and 90 selectively provide one of these inputs to modified reservation station 92 and reservation station 96, respectively.

Datapath 80 is similar to a dual-issued superscalar machine. This datapath can be split into two parts (indicated by the dotted line in FIG. 13), each associated with an instruction issue width. In this example, modified reservation station 92 contains four entries that store all the necessary information for executing general instructions, including general two-operand ALU instructions. For example, each entry would contain a field for each of the instruction index of the RII, the source register number for each operand, the instruction index of the instruction producing the source operand for each operand, the source operand (if valid), and the final result (the precomputed result). Therefore, the results produced by functional unit 94, included within instruction folding unit 100, may be stored in modified reservation station 92. These stored results are then written back to register file 86, via result_bus2, at the appropriate instance, as was described above. That is, the results of the folded instructions are provided at the proper time.

The hardware storage registers described in FIGS. 7–10 would be included in instruction folding unit 100, and depending on the amount of instructions to be folded and the types of instructions to be folded, instruction folding unit 100 would require more or less than just four entries with more or less than the 8 fields described above for each entry. For example, if instruction folding is restricted to branches, loads and stores, and one-operand ALUs rather than two-operand ALUs, then only 5 fields for each entry would be required. Instruction folding unit 100 adds additional hardware to a datapath, but this cost is minimal compared to the savings in execution time due to instruction folding.

Alternatively, datapath 80 can be used in a way that both parts (above and below the dotted lines) are used only for executing program loops. During these program loops, the execution pipeline operates in a dual-issued mode, as was described above. When not executing a program loop, only the lower portion is used, and the execution pipeline thus operates in single-issued mode. This scheme works best when an application spends the majority of its time executing program loops, and closely resembles a datapath for a dual-issued superscalar machine, except that only half of the datapath is utilized when not executing a program loop (thus operating in "single-issued mode").

In addition to folding RIIs as was discussed above, LIIs may also be folded out of a loop. This is accomplished by collecting intra- and inter-iteration data dependency information during a loop's execution. This information is then used to select appropriate LIIs available for folding. When a program loop is encountered (through the detection and taking of an SBB), the hardware collects the intra- and inter-instruction dependency information during the second iteration of the loop (WARMUP1). It constructs a dependency bit vector to represent the data dependency of each instruction in the loop, in relation to its previous instruction in the program order. Each element in this dependency vector has two bits and is associated with a single instruction in the loop. These two bits represent whether the instruction source operands have a data dependency with the prior instruction.

For example, a "01" could mean that the instruction has no data dependency for its first operand (indicated by the 0), but has a data dependency on its second operand (indicated by the 1) with its prior instruction. A "00" would therefore mean that the instruction is independent from its previous instruction, and both instructions (the current one and the previous one) can be issued simultaneously. In effect, two instructions are "folded" into one, thus saving execution time. From the third iteration and beyond, the hardware then utilizes this bit vector to control all the instruction issuing and data feed-forwarding activities in the data path. LII folding can be better understood in reference to FIGS. 14 and 15.

Figures 14, 15:
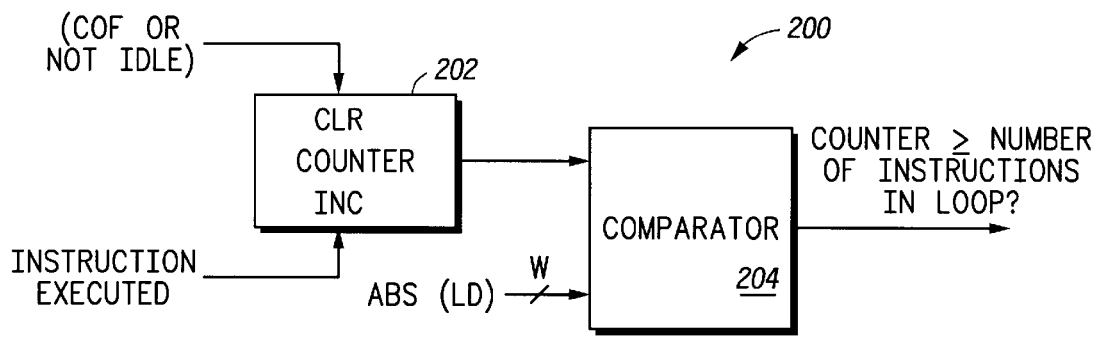
FIG. 14 includes an illustration of a program loop with its corresponding dependency vector, in accordance with one embodiment of the present invention.
FIG. 15 includes an illustration of a validation counter in accordance with one embodiment of the present invention.

FIG. 14 illustrates the program loop of FIG. 4 with one embodiment of a corresponding bit vector as was described above for LII folding. Each row of the bit vector corresponds to one instruction of the loop. For example, the first row corresponds to the "addi r2,2" instruction, and the second row to the "ld.h r7, (r2)" instruction. The columns of the bit vector labeled "x" and "y" refer to the source and/or destination operands of the instruction. For example, an ALU instruction is written in the format "ALU_instruction $r_x r_y$," where $r_x$ refers to the destination and $r_y$ to the source. Therefore, the bit vector, for these types of instructions, indicates whether the source register was modified by the previous instruction. Similarly, a load/store instruction is written in the format "Load/store_instruction $r_y, r_x$." In the case of a load instruction, $r_y$ indicates the destination, and $r_x$ the source. In a store instruction, $r_y$ is the source of the data to be stored, and $r_x$ the source of the address where the data is to be stored.

The first row in the dependency vector is "00" since the first instruction in the loop does not depend on its previous instruction. Since the source register, r2, of the second instruction in the loop ("ld.h r7,(r2)") is being modified by the previous instruction, the "x" bit in the second row of the dependency vector (corresponding to a load's source register) is set to 1. The destination register, r7, includes no dependencies on the previous instruction, and therefore the "y" bit in the second row of the bit vector is set to 0. The third row of the bit vector is "00" since neither r3 or the immediate "1"of the addi instruction is dependent on the previous instruction. The fourth row of the bit vector is "10" to indicate that the source register of the load instruction is dependent upon the previous instruction (the "addi r3, 1"). The fifth row of the bit vector is "01" since the source register r6 of the "mul" instruction is dependent upon the previous instruction (the "ld.b r6,(r3)"). The rest of the rows in the bit vector are filled in accordingly. The bit vector can be stored in various ways, and in other embodiments, a 0 instead of a 1 may indicate a dependency.

Instead of initializing the dependency vector starting from the second iteration, the hardware can also construct the vector during the first iteration. In this case, the lower address bits of the instructions are used to index into the rows in the dependency vector. In one embodiment, there is a validation counter for keeping track of the number of valid entries in the dependency vector. FIG. 15 illustrates one embodiment of validation counter 200, which includes counter 202 and comparator 204. Counter 202 is cleared when there is a change of flow or the state is not IDLE, and is incremented when an instruction is executed. Comparator 204 receives the output of counter 202 and the w-bits from the SBB (denoted as abs(LD) which denotes the absolute value of the negative quantity, LD), and its output indicates whether the counter value is greater than or equal to the number of instructions in the loop.

Validation counter 200 is used to determined whether the loop was initially entered into at the beginning of the loop (e.g. the "addi r2,2" instruction of FIG. 14) or was jumped into somewhere in the body of the loop, after the first instruction (e.g. any of the instructions after the "addi r2,2" of FIG. 14). If the loop is entered from the beginning, then each instruction of the loop is examined during the first iteration of the loop; however, if the loop is entered into from somewhere other than the beginning, then the instructions before the entry point are not examined during the loop's first iteration. Therefore, the dependency vector is only valid at the end of the first iteration if the loop is entered into from the beginning instruction.

In operation, counter 202 clears to zero each time there is a change of flow, thus nullifying the entire dependency vector. When an SBB is encountered and taken, the value of counter 202 is compared by comparator 204 with the loop size information (LD) inferred from the SBB instruction. If the counter value is equal to or greater than the loop size, indicating that all the sequential dependency information for the entire loop has been captured, then the dependency vector can be used immediately, starting from the second iteration. However, if the counter value is smaller than the loop size, then the dependency vector has to be completely reconstructed during the second iteration, and utilization of the dependency vector can only occur during the third iteration.

Therefore, from the third iteration and beyond, the hardware utilizes this bit vector to control all the data feed-forwarding activities in the datapath. Thus, the dependency bit vectors aid in instruction folding, as described above. Using this approach, the data feed-forwarding decisions are not made on a cycle-to-cycle basis, and are unlikely to lie on the critical paths of the machine. This offers a relatively low hardware cost solution, and works best if an application spends most of its time in program loop executions.

The concepts related to instruction folding and data prefetching described herein above can apply to any data processing system the incorporates program loops. Low system cost and low energy consumption are two important factors to consider in designing many embedded systems. Instruction folding described herein is a low-cost loop execution scheme that reduces the instruction fetch energy when executing program loops, especially small, highly iterative loops.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of controlling execution of a program loop in a data processing system, comprising:
   detecting execution of the program loop, and in response to detecting execution of the program loop:
   selecting an instruction in the loop;
   storing dependency information corresponding to the selected instruction, wherein the dependency information is stored with an instruction index corresponding to the selected instruction; and
   using the stored dependency information to precompute the selected instruction for a subsequent iteration of the program loop.

2. The method of claim 1, further comprising storing data dependency information during a first iteration of the program loop.

3. The method of claim 2, further comprising storing prefetched data during a second iteration of the loop corresponding to the selected instruction.

4. The method of claim 2, wherein the subsequent iteration of the program loop occurs after one of at least one, at least two, or at least three iterations of the program loop.

5. The method of claim 2, wherein the data dependency information includes an instruction index, a source register, and a stride value.

6. The method of claim 2, wherein the data dependency information includes an instruction index, a source register, and a source register instruction index.

7. The method of claim 2, wherein the data dependency information is stored in a bit vector, wherein a bit of the bit vector corresponds with a register of the data processing system.

8. The method of claim 7, wherein the bit indicates if the corresponding register has been modified.

9. The method of claim 2, wherein the data dependency information includes a valid field that indicates whether a corresponding load instruction is located within the program loop, and further comprising:
   if the load instruction is within the program loop, initiating prefetching the data at the end of the first iteration of the program loop.

10. The method of claim 1, wherein the selected instruction has a first execution time during a first iteration of the loop and a second execution time during the subsequent iteration of the program loop, the second execution time being less than the first execution time.

11. The method of claim 1, wherein a plurality of instructions in the program loop have a corresponding instruction index, the method further comprising using the instruction indexes to provide results of the precomputed selected instruction at a correct time for proper instruction stream execution during the subsequent iteration of the program loop.

12. A method of controlling execution of a program loop in a data processing system, comprising:
   detecting execution of the program loop;
   scanning the program loop for remote independent instructions (RIIs) during at least one iteration of the program loop, wherein scanning the program loop of RIIs comprises scanning the program loop for data dependencies beyond a current execution window;
   selecting at least one RII to fold; and folding the at least one RII during a subsequent iteration of the program loop, wherein the at least one RII is characterized as a folded instruction, wherein the at least one RII has a first execution time prior to folding and a second execution time after folding, wherein the second execution Lime is less than the first execution time.

13. The method of claim 12, wherein detecting execution of the program loop comprises detecting execution of a branch instruction.

14. The method of claim 13, wherein the branch instruction is a Short Backwards Branch (SBB) instruction.

15. The method of claim 12, further comprising:
   selecting a plurality of RIIs to fold; and
   folding the plurality of RIIs during the subsequent iteration of the program loop, wherein each of the plurality of RIIs is characterized as a folded instruction.

16. The method or claim 12, further comprising storing information relating Lo the at least one RII during a first iteration of the program loop.

17. The method of claim 16, further comprising storing information relating to the at least one RII during a second iteration of the program loop.

18. The method of claim 16, wherein the information relating to the at least one RII is used to select the at least one RII to fold.

19. The method of claim 16, wherein storing information relating to the at least one RII includes storing precomputed data relating to the at least one RII.

20. The method of claim 19, further comprising provided the precomputed data at a predetermined time.

21. The method of claim 20, wherein each instruction in the program loop has a corresponding instruction index, and using the instruction indexes to determine the predetermined time.

22. The method of claim 12, wherein the second execution time is zero.

23. The method of claim 12, wherein the at least one RII is a predictable instruction.

24. The method of claim 23, wherein the at least one RII is a totally predictable instruction.

25. A method of controlling execution of a program loop in a data processing system, comprising:
   detecting execution of the program loop;
   scanning the program loop for data dependencies during at least one iteration of the program loops;
   selecting at least one instruction to fold; and
   folding the at least one instruction during subsequent iteration of the program loop, wherein the at least one instruction is characterized as a folded instruction, wherein the folded instruction has a first execution time prior to folding and a second execution time after folding, wherein the second execution time is less than the first execution time.

26. The method of claim 25, further comprising storing the data dependencies.

27. The method of claim 26, further comprising storing the data dependencies until the program loop completes execution.

28. The method of claim 25, further comprising scanning the program loop for data dependencies during a plurality of iterations of the program loop.

29. The method of claim 25, wherein detecting the execution of the program loop is performed by detecting a branch instruction.

30. The method of claim 29, wherein the branch instruction is a backwards branch instruction.

31. The method of claim 25, further comprising storing the data dependencies.

32. The method of claim 31, further comprising storing precomputed data associated with the folded instruction.

33. The method of claim 32, further comprising providing the precomputed data associated the folded instruction at a predetermined time during the program's loop execution.

34. The method of claim 25 wherein the second execution time is zero.

35. The method of claim 25, wherein the folded instruction is a predictable instruction.

36. The method of claim 35, wherein the at least one RII is a totally predictable instruction.

37. The method of claim 25, wherein the folded instruction is one of a branch instruction, an ALU instruction, a load instruction, and a store instruction.

38. The method of claim 37, wherein the folded instruction is a load instruction and further comprising storing the data dependencies in an instruction folding unit.

39. The method of claim 38, further comprising storing precomputed data associated with the folded instruction, wherein the precomputed data includes prefetched data.

40. The method of claim 38, wherein the data dependencies include an instruction index, a source register, and a stride value.

41. The method of claim 38, wherein the data dependencies include an instruction index, a source register, and a source register instruction index.

42. The method of claim 38, wherein the data dependencies are stored in bit vector, wherein a bit of the bit vector corresponds with a register of the data processing system.

43. The method of claim 42, wherein the bit indicates if the corresponding register has been modified.

44. A method of controlling execution of a program loop, comprising:

detecting execution of a program loop;

in response to detecting execution of the program loop, storing intra-loop data dependency information in a dependency bit vector wherein each entry in the dependency bit vector corresponds to an instruction of the program loop, and wherein each entry indicates whether a source of the corresponding instruction is modified by a previous instruction within the program loop; and using the dependency bit vector to select at least one Local Independent Instruction (LII) available for folding.

45. The method of claim 44, further comprising folding the at least one LII.

46. The method of claim 44, wherein the program loop includes a first iteration prior to a second iteration, and further comprising initializing the dependency bit vector during the second iteration.

47. The method of claim 44, further comprising initializing the dependency bit vector during a first iteration of the program loop.

48. The method of claim 47, wherein detecting execution of the program loop includes detecting a backwards branch instruction.

49. The method of claim 48, wherein the first iteration is prior to detecting the backwards branch instruction.

50. The method of claim 47, further comprising checking a corresponding counter value to determine if initialization is complete.

51. The method of claim 50, wherein if initialization is not complete, further comprising initializing the dependency bit vector during a second iteration after the first iteration of the program loop.

52. The method of claim 44, wherein the previous instruction is an immediate previous instruction.

53. The method of claim 44, wherein each entry indicates whether each source of the corresponding instruction is modified by a previous instruction within the program loop.

54. A data processing system comprising:

a validation counter; and a storage unit coupled to the validation counter wherein the storage unit comprises a dependency bit vector corresponding to instructions of a program loop, wherein the dependency bit vector comprises a plurality of entries, each corresponding to an instruction of the program loop, each of the plurality of entries indicating whether a source of the corresponding instruction is modified by a previous instruction within the program loop.

55. The data processing system of claim 54, wherein the validation counter includes a counter and a comparator coupled to the counter.

56. The data processing system of claim 54, wherein the previous instruction is an immediately previous instruction.

57. A method of controlling execution of a program loop in a data processing system, comprising:

providing a vector having a plurality of entries, each of the plurality of entries corresponding to a register of the data processing system;

detecting execution of the program loop;

in response to detecting the program loop, determining when a register of the data processing system is modified by an instruction within the program loop and when a register of the data processing is modified by an Instruction within the loop, setting a corresponding entry in the vector corresponding to the modified register to indicate that the register has been modified;

selecting an instruction in the program loop as a candidate for folding;

determining a source register of the selected instruction; and during execution of the program loop, when the selected instruction is encountered, using the entry of the vector corresponding to the source register to indicate if the selected instruction can be folded.

* * * * *

UNITED STATES PATENT AND TRADEMARK OFFICE
CERTIFICATE OF CORRECTION

PATENT NO.        : 6,775,765 B1                                    Page 1 of 1
APPLICATION NO. : 09/498814
DATED             : August 10, 2004
INVENTOR(S)       : Lea Hwang Lee et al.

It is certified that error appears in the above-identified patent and that said Letters Patent is hereby corrected as shown below:

In Column 20, Line 5, Claim No. 12:

Change "Lime" to --Time--

In Column 20, Line 17, Claim No. 15:

Change "Lo" to --to--

In Column 20, Line 44, Claim No. 25:

Change "loops" to --loop--

In Column 22, Line 43, Claim No. 57:

Change "Instruction" to --instruction--

Signed and Sealed this

Twenty-fifth Day of December, 2007

JON W. DUDAS
*Director of the United States Patent and Trademark Office*